United States Patent Office 3,042,515
Patented July 3, 1962

3,042,515
PRINT-OUT COMPOSITIONS FOR PHOTOGRAPHIC
PURPOSES AND PROCESS OF USING SAME
Eugene Wainer, Cleveland Heights, Ohio, assignor to
Horizons Incorporated, Cleveland, Ohio, a corporation
of New Jersey
No Drawing. Filed Jan. 16, 1959, Ser. No. 787,112
19 Claims. (Cl. 96—48)

This invention relates to compositions of matter which are sensitive to light and suitable for photographic and photographic reproduction purposes. More particularly, the invention relates to the production of stable colored print-out images produced by exposing to light compositions comprising: a plastic binder or film exposing dispersing medium, one or more aryl amines and one or more halogenated compounds selected from the group which are capable of generating halogen free radicals on exposure to ultra violet or visible light and which may include additional constituents which affect the stability and/or sensitivity of the system.

Principal objects of this invention are to effect a reaction between aryl amines and halogen compounds so that under the influence of ultraviolet light a colored form is produced as the result of the foregoing reaction; to develop this color forming reaction rapidly enough so that the total time of exposure, developing and fixing to a permanent and stable image does not exceed a few minutes; to provide systems in the exposure, development, and fixing stages which may be processed by totally dry techniques; to provide means of stabilization of the pre-exposed surfaces so that the desired color reactions take place only on exposure to light; to provide means of stabilization of the developed image so that once formed; it is sufficiently permanent for practical purposes; to provide means of stabilization of the unexposed portions of the image so that on continued exposure to light after the first images are formed, color and fogging do not develop; to provide print-out systems which are sensitive to visible light; to provide a range of colored images which effectively blanket the visible spectrum range from complete absorption of light, such as black to specific colors such as blues, greens, yellows, reds, purples, and modifications thereof; and, it is a further object of the invention to establish systems in which the desired color is developed by exposure to light and the facility for producing such color as a result of exposure to light of a similar wavelength is destroyed by exposure of the system to strong infrared or heat. These and other objects of the invention will become apparent in the description which follows.

The fact that certain aryl amines in pure and colorless form produce colored products on exposure to light and air has long been known. In some cases, the speed of such a color forming decomposition reaction is modified by the presence of traces of impurities but, in general, the reaction takes place quite slowly and normally the full color possible from a particular aryl amine may require days or weeks and sometimes even months of constant exposure to visible light in the presence of air. For the most part, these aryl amines remain color stable if kept in the dark even in the presence of air, but in order to prevent these reactions, normally the materials are stored in opaque containers in the tightly sealed condition to prevent the ready access of air. Many examples of such decomposition reactions may be given but a few will suffice to establish the extent of the reactions which take place. Freshly distilled aniline will remain colorless indefinitely if stored in a brown bottle where the air above the liquid has been replaced with nitrogen. Even if exposed to the air in such a brown bottle, the originally colorless aniline will start to develop a faint yellow color over a period of weeks to months and several months of storage under such conditions are required before darker colors are produced. Diphenylamine exhibits similar but somewhat more rapid reactions. Again the compound is stable if stored in a brown bottle whether air is present or not, but on continuous exposure to light and air, the material darkens rapidly so that purplish colors develop in periods of twelve to twenty-four hours. Other aryl amines are known in which exposure to light and air will cause dark colored products to form in a space of several hours. If powerful oxidizing agents are present such as peroxides or ammonium persulfate, the color reaction is accelerated even in the dark and will continue to be effective until all of the oxidizing agent has been consumed. In the presence of these powerful oxidizing agents, color forming takes place even more rapidly on exposure to light. The fact that a rapid dark reaction takes place makes it impractical to utilize these agents as a basis for color formation for practical purposes.

In the modern field of industrial, technical, and professional photography and photographic reproduction, the trend is towards higher speeds, simpler processing, and systems and processing which require practically no skill in order to make them useful. Ideally, if the entire processing may be accomplished automatically totally by use of radiant or thermal energy or combinations of both, the possibilities for error through use of complicated chemicals are thereby minimized or eliminated. Obviously such type of dry processing exhibits further advantages of economics and solves problems in logistics in that the transportation of carefully prepared, expensive, and bulky solutions of chemicals is not required. Through use of dry processing techniques, automatic equipment needed for accomplishing the desired end result of dry processing may be designed so as to be compact, low in cost, and sufficiently simple in design and construction so that worn out parts may be replaced readily and repairs accomplished easily by non-technical personnel.

As a practical requirement, such equipment and the sensitive surfaces being exposed in such equipment must enable the desired end result to be obtained in times not exceeding a few minutes and preferably not exceeding several seconds. It is also mandatory that the sensitive surfaces before exposure should have reasonable shelf stability, the images obtained after exposure, development, and fixing should be equally stable and the unexposed backgrounds should not be subject to fog on storage or normal handling.

Requirements as indicated in the foregoing paragraphs are imposed in such segments of utility as in the photocopy field for blueprints and technical information, the reproduction of typed and printed pages, images obtained by transmission through microfilm, the recording of information as obtained from XY devices in technical and laboratory areas, and the direct recording of various transient events.

Describing my invention first in general terms, I have found that certain primary, secondary, and tertiary aryl amines, separately or in combination, when mixed with certain organic halogen compounds, which may be alkyl or aryl derivatives or mixtures thereof, will, depending on the nature of the amine and halogenating compound in question, produce brilliantly colored products on exposure to light in times of a few seconds, or in some cases in fractions of seconds. While this reaction takes place rapidly in solution, it develops even more rapidly when the reactants have been deposited as a thin film containing a suitable binder. Such binders are normally plastic film formers and in the chemical system contemplated they may act as hydrogen donors.

In dry form, the reaction takes place much more readily in the presence of a film former which may possibly act as a hydrogen donor. It thus appears that the overall color forming reaction may be the result of formation of free radicals developed as a consequence of photodecomposition or photodissociation of the halogenated compounds and of the plastic base in the presence of these halogenated compounds, the halogen adding itself to the amine side chain and the hydrogen or alkyl groups formed in the reaction probably adding either directly to the aryl nucleus or to the plastic film former. As a result, resonance is developed in a conjugated system yielding the desired colors.

On exposure to light, a reaction takes place between the halogenated compounds and the aryl amines to produce the color. The three basic reagents of plastic binder or film former, the aryl amine, and the halogenated compounds are so chosen that a different type of reaction takes place when the system is heated. Though members of the system can be so chosen that a brightly colored image will also develop on exposure to heat, it is possible to develop the choice so that on heating, a reaction takes place only between the resinous base material and the halogenating compounds, thus eliminating the halogenating compound from the sphere of the reaction so it can no longer catalyze the color forming reaction of the amine in the system, and this takes place without the development of color. After such treatment, the color forming reaction is either minimized or eliminated entirely and this represents a basis for dry fixing.

I have further discovered that combinations of certain of the reagents in question will slowly react in solution form prior to deposition in the form of a dry film, and I have found that this reactivity prior to deposition and exposure may be eliminated by the addition of basic materials such as alkyl amines, zinc oxide, and the like. Relatively minor percentages of such stabilizers are required and they appear to maintain the preparations both in solution form prior to film deposition and on the pre-exposed film itself in stable substantially colorless form, substantially indefinitely or for practical periods of time.

In the systems as described above, fogging of the unexposed portions develops slowly over a period of weeks on exposure to air in the presence of light or heat or both, and it appears that this reaction requires the presence of air in that the colors which develop as the result of fogging tend to be different in hue than those obtained by the primary halogenating reactions. I have found that the addition of minor percentages of certain reducing agents prevent or eliminate this type of fogging so that not only is the image and background stabilized for indefinite periods after heat fixing, but fogging is minimized or eliminated entirely in the heat fixing step itself. These stabilizing agents are polyhydric phenols and amino-phenols.

In general, the systems as described above are sensitive only to ultraviolet light, useful sensitivity beginning at 4000 Angstrom units and at wavelengths less than this figure. A practical range appears to be a spectral region of 3000 to 4000 Angstrom units. In many cases, this represents an advantage since it prevents fogging on continued exposure to diffuse daylight or ordinary room light and aids the stability of the exposed system under storage conditions. However, in many cases, sensitivity to the visible range is a desired characteristic and this may be imparted by adding to the combination of aryl amines used as the base color producers a member whose fully exposed condition under the circumstances described above produces a deep yellow or red color. In adding this sensitizer to the visible which may be utilized in minor or major amounts, it is a requirement that it be present in a partially light struck condition. While the specific groups of compounds useful as photosensitizers to the visible will be defined later, the partially light struck condition is an important requirement so that the majority of the sensitizer is still in the unreacted form and by its presence, a very faint yellow to red color is imparted to the film due to the minor portion of the overall sensitizer available in colored form. Under these conditions, the speed of the system is not impaired whereas some slowing of the speed is encountered if the compound added as a photo-sensitizer is in fully color developed form.

Continuous tone effects are possible with these systems and color formers are produced so that, in effect, narrow spectral ranges covering the entire visible range from deep violet to deep red may be utilized. Some of the individual members yield products on exposure and heat development which are essentially black as a result of their rather total absorption of the visible, but generally the clean brilliant spectral colors are available. Blacks or near blacks are obtainable also by utilizing mixtures of suitable aryl amines as, for example, a mixture including an amine which produces red, a second which produces yellow, a third which produces blue, a fourth which produces green, and finally a fifth which produces violet. By adjusting the amounts of each of these reagents, deep blacks or brownish blacks may be obtained. In most cases, the expected development of black color is obtained only from amines of complex structure with numerous side chains already attached to the aryl nucleus.

Mixtures of simple aryl amines sometimes yield unexpected results. For example, aniline treated as described in the foregoing usually produces purplish to black colors whereas paratoluidine produces yellows. In both cases, the reactions are relatively slow. If a mixture of aniline, para-toluidine, and ortho-toluidine is treated in accordance with the teachings of the foregoing, the photo reaction is rapid and deep red colors develop out.

In brief, my invention comprises light sensitive printout compositions which develop color on exposure to light and which are capable of being fixed in stable form by subsequent heating, and which are composed of combinations of aryl amines, halogenating agents, and a plastic film forming base, and optionally containing one or more additional constituents such as minor amounts of basic materials such as amines or zinc oxide for a stabilization of the mixture before exposure, minor amounts of phenol derivatives for stabilization of the mixture after development and fixing, and particularly in the presence of light, heat, and air; combinations of these aryl amines to produce specific color effects; sensitization of the system to the visible by the addition of a yellow to red aryl amine type color former and exposure to ultraviolet if this visible range color sensitizer is not present; and finally disposing such overall system on a suitable base such as glass, paper, plastic film, and the like.

Details of the invention will now be described by referring to specific combinations of materials and to various precautions which need to be observed in order to obtain the desired results, it being understood that these compositions and the processing of same are given by way of illustration and are not to be construed as limitative embodiments of my invention.

All of the various ingredients of the light sensitive composition are preferably dispersed or dissolved in a plastic binder. More uniform results are obtained if at least a portion and preferably all of the ingredients are soluble in the plastic binder. The only exceptions to this requirement is where a solid base such as zinc oxide is used for stabilization of the halogenating compound, on inert fillers of inorganic nature added in order to increase opacity, or inert fillers added to reduce volatility of components.

Typical binders and the recommended solvents for these binders are listed in Table 1. It has been found that the recommended solvents have the ability to produce a relatively low viscosity solution of the plastic material in question at concentrations of plastic in the range of 5 to 10% and that the solvent is one providing as complete solubility for all the reagents as possible. For example, polystyrene is readily soluble in toluene. However, if the toluene-polystyrene mixture is utilized for a composition which contains a substantial proportion of polyhydric phenols, for example, a small amount of methyl alcohol added to the toluene increases the solubility of this latter compound.

TABLE I

*Plastic Film Forming Bases and Solvents for Same*

| No. | Resin | Solvent |
|---|---|---|
| 1 | Polyvinylidene chloride | 50 acetone + 50 toluene. |
| 2 | Polystyrene | Toluene (+CH₃OH). |
| 3 | Polyethylene | Do. |
| 4 | Polyvinyl chloride | 80 tetrahydrofuran + 20 toluene. |
| 5 | Polymethylmethacrylate | 30 acetone + 40 ethyl acetate + 30 toluene. |
| 6 | Polyvinylacetate | 40 methyl alcohol + 40 acetone + 20 toluene. |
| 7 | Ethyl cellulose | 30 acetone + 40 toluene + 30 methyl alcohol. |
| 8 | Cellulose acetate | 30 trichlorethylene + 70 acetone. |
| 9 | Cellulose triacetate | Do. |
| 10 | Cellulose nitrate | 50 acetone + 50 ethyl acetate. |
| 11 | Chlorinated rubber | 60 toluene + 40 acetone. |
| 12 | Mixture of above | Mixtures of hydrocarbons, esters, alcohols. |

There are significant differences in the behavior of the various plastic materials used as the base, and it appears that they may be separated into two classes, namely, those containing oxygen and those not containing oxygen. In general, the non-oxygen binders, other things being equal, yield a light sensitive system which is somewhat more sensitive than those involving oxygen-containing plastic binders, and at the same time the light exposed films are somewhat less stable in the unexposed areas both in fixing and on storage in the presence of light and heat. For this reason, I prefer to employ the aryl amines which develop color reactions most rapidly in compositions including an oxygen-containing binder such as polyvinyl acetate, cellulose acetate, ethyl cellulose, and the like and to use those aryl amines which exhibit a lower sensitivity on exposure to light with respect to color formation in compositions having the non-oxygenated type of binder. To obtain extreme speed, it is possible to use a combination of the non-oxygenated binder and the high speed aryl amines by increasing the amount of stabilizers which protect the exposed film against a combination of light, heat, and air and, in addition, by laying over the film containing the light sensitive composition a coating of the plastic base itself containing a small amount of the stabilizer only. Under such conditions, the high speed system is about as stable as the lower speed systems, but in view of the double coating requirement, it is somewhat more expensive.

Aryl amines which have been used in this invention may be described by the formula

wherein R is an aryl nucleus such as a benzene, naphthalene, or anthracene nucleus which may be either unsubstituted or substituted e.g. with alkyl, halogen or aryl groups and X and Y are each selected from the group consisting of alkyl, aryl, arylkalyl, halogen and hydrogen and may be either the same or may be different. Typical aryl amines considered generally useful for the purpose are listed in Table II. Dealing first with the purely chemical aspects of this group of amines, it will be noted that in every case these are aryl amines in which the amine group is a side chain attached directly to an aryl nucleus. While the aryl nucleus is usually a benzene ring in the amines listed, it has been found that naphthalene and anthracene nuclei are also effective. Primary, secondary, and tertiary amine side chains are effective. In addition to the hydrogen which may be attached to the nitrogen in the amine side chain, in the case of substituted derivatives, the color producing action is more effective from the standpoint of depth of color and speed on exposure to light if alkyl substitution is utilized rather than aryl substitution. Thus, methyl and ethyl radical substitution is more effective than phenyl in the amine side chain, providing, as indicated above, the amine side chain is in turn attached to the aryl nucleus. For example, triphenylamine produces a green color rather slowly under conditions to be described later, whereas diphenylmethyl amine produces a much deeper color and more rapidly than triphenylamine and dimethylphenylamine exhibits a still deeper color and more rapid still than its related compounds.

The color reactions of the amines tabulated in Table II were determined arbitrarily in systems comprising solutions of the halogenating agent and the amine in toluene, the halogenating agent being either carbon tetrachloride, carbon tetrabromide, or iodoform in these reactions. The solutions containing these ingredients were exposed to a 275 watt General Electric sunlamp of reflector type at a distance of 10 inches and the times in the table were taken as an indication of the speed. The listed times are those at which the color was sufficiently well developed in each instance about 10 parts by weight of the amine was dissolved in 100 parts by weight of toluene and 5 parts by weight of halogenating agent was used so as to be easily recognized and this point was usually after the first emergence of the color. In some cases, color producing reactions were obtained only with one of the halogen types and not with others. Such cases are indicated by blank spaces in the table. In addition, as the atomic weight of the halogen used increased, usually the color produced shifted from the shorter wavelength in the visible spectrum to lighter colors of the longer wavelength portions of the spectrum. In defining both color and speed on this arbitrary basis, it is to be noted that stabilizers and photosensitizers to the visible were omitted from the systems investigated. The light used for the purpose has a large portion of its radiation in the visible range and a significant portion in the 3000 to 4000 Angstrom unit range with a peak near the 4000 Angstrom unit range in view of the fact that the General Electric sunlamp uses a glass envelope.

The illustrated aryl amines have been divided into three classes, namely: those which exhibit pronounced color reactions in 10 seconds or less, those which show pronounced color reactions in the range of 10 to 30 seconds, and those which show pronounced color reaction in the range of 30 to 60 seconds, these time ranges referring to times of exposure before the first emergence of a recognizable color, in the systems described above.

It has been found that the amount of stabilizer required usually varies directly as the speed, that is, the faster the development of the color reaction the more stabilizer is necessary to make the system of practical interest. Preferably these extremely fast color developers are dispersed in an oxygen-containing binder rather than in a non-oxygen type. The relatively slow color developers require little or no stabilizer, and their speed may be enhanced by dispersion in a non-oxygen base and preferably with the addition of photosensitizers to the visible as described later.

Some of the aryl amines illustrated in Table II yield black or almost black colors. Substantially complete absorption of light (thus yielding a black) may also be produced by using mixtures of several aryl amines, chosen so as to add up the various spectral sections in visible light. For example, combinations of the first five or the first six amines listed in the table provide such a result and suitable combinations of other listed amines also yield blacks.

TABLE II

Color Producing Properties of Aryl Amines

CLASS 1 (1 TO 10 SECOND SPEED)

| No. | Aryl amine | Halogenating Agent | | |
|---|---|---|---|---|
| | | CCl₄ | CBr₄ | CHI₃ |
| 1 | 4,4',4'' methylidenetris (N,N-dimethylaniline) (Leuco crystal violet) | Violet | Blue | Green. |
| 2 | p,p' Benzylidenebis (N,N-dimethylaniline) (Leuco malachite green) | Blue green | Green | Green. |
| 3 | p,p' Iminylidenebis (N,N-dimethylaniline) (Auramine base) | Yellow | Yellow | Red. |
| 4 | p,p',p'' Triamino-o-methyl triphenylmethane (Fuschin base) | Violet | Red | Red. |
| 5 | p,p',p'' Triaminotriphenyl carbinol | Pink | Red | Red. |
| 6 | p,p' Tetramethyldiamino dipenyl-4-anilino naphthylmethane | Violet | Blue | Blue black. |
| 7 | Amine 1 + amine 2 | Violet | Green | Brown. |

CLASS 2 (10 TO 30 SECOND SPEED)

| No. | Aryl amine | CCl₄ | CBr₄ | CHI₃ |
|---|---|---|---|---|
| 8 | p,p',p'' Triaminotriphenyl Methane (Leuco-p-rosaniline) | Pink | Red | Red. |
| 9 | 1,2 dianilinoethylene | Yellow green | Yellow | Yellow. |
| 10 | N,N dimethyl-p-phenylenediamine | Green | Green | Yellow green. |
| 11 | p,p' Tetramethyldiaminodiphenylmethane | Green | Green | Green brown. |
| 12 | Aniline | Yellow | Brown | Brown. |
| 13 | Diphenylamine | Black | Black | Purple. |
| 14 | N,N-diethylaniline | Purple | Purple | Purple. |
| 15 | N,N-dimethylaniline | Purple | Black | Black. |
| 16 | o-Toluidine | Yellow | | |
| 17 | N-methyldiphenylamine | Black | Green | Green yellow. |
| 18 | 2,5 dichloroaniline | Purple | Black | Black. |
| 19 | Aniline, p-toluidine, o-toluidine | Lavender | Red | Deep red. |

CLASS 3 (30 TO 60 SECOND SPEED)

| No. | Aryl amine | CCl₄ | CBr₄ | CHI₃ |
|---|---|---|---|---|
| 20 | Diaminodipheynlmethane | Yellow | Yellow | Green yellow. |
| 21 | Naphthylamine | Green | Green | Green. |
| 22 | Triphenylamine | Green | | |
| 23 | 1,2,3 triphenylguanidine | Green | | |
| 24 | o-Bromo N,N-dimethylaniline | Green | Green yellow | Yellow. |
| 25 | 4-chloro-o-phenylenediamine | Green | Green yellow | Yellow. |
| 26 | o-Bromoaniline | Green | Green yellow | Yellow. |
| 27 | o-Chloroaniline | Green | Green yellow | Yellow. |
| 28 | 4,4' biphenyldiamine | Blue | Green | Dark green. |

With two or three significant exceptions, these normally colorless materials yield color only on exposure to ultraviolet below 4000 Angstrom units. The amines which develop yellow and red colors are sensitive to the visible and particularly the blue and green portions of the visible spectrum. It has been found that this sensitivity is enhanced if the material is first given a very brief exposure (i.e. a fraction of a second) to the ultraviolet light. On subsequent exposure to visible light, the sensitivity of the partially color formed material appears to be equivalent to that obtained in ultraviolet light. More important than this finding, however, is the fact that the addition of such a partially color formed amine to systems containing other amines make the entire system sensitive to the visible. Of particular value for this purpose is the compound para-para'-aminobis(N,N-dimethylaniline). Amines numbers 5 and 8 are also useful alone or in combination with amine 3 for these purposes.

In summary, systems comprised of suitable halogenating agents and aryl amines taken from the table and of the types indicated by the table have been found to be useful as color producers in times of seconds exposure either to ultraviolet light or to the visible or both. Sensitivity to the visible is imparted by use of a partially modified amine which normally develops yellows and red color on exposure to ultraviolet light by adding these to the system in a partially exposed condition. The stability of the system after exposure, development and fixing appears to be a function of the speed with which this color originally develops. Such stability is developed either through choice of a suitable plastic binder or through the addition of stabilizing agents to a greater or less degree or both. With aryl amines such as those listed in classes 2 and 3 of Table II, very little or no stabilizer appears to be required in actual use.

Halogenating agents exemplifying some of the halogenating agents which may be used for the purposes of this invention are listed in Tables III and IV. While I do not wish to be bound by any specific theory, it appears that the reaction which takes place between the halogenating agent and the aryl amine is the result of the formation of a halogen free radical, leaving a free radical residue. The free radical halogen then combines with the aryl amine to produce the desired color. It would appear, therefore, that virtually all halogenated compounds which are capable of generating halogen free radicals on exposure to ultraviolet or visible light or both are suitable for the purposes of the invention. As exemplified a wide variety of alkyl, aryl and aryl alkyl halides may be employed in the print out systems of the present invention.

In using these compounds, it has been noted that for the halogenating agents listed in Table IV a slow, dark reaction takes place in the solution prior to film deposition in some cases, and this may proceed after some weeks of storage to an extent where serious fogging of unexposed backgrounds is exhibited. At the same time, these compounds also have the valuable property of showing the highest speed of reaction. It has been found that this dark reaction can be minimized or eliminated entirely by adding minor percentages of alkaline compounds and particularly alkyl amines, derivatives of alkyl amines, or closely related compounds. In addition, slightly basic inorganic materials such as zinc oxide are also effective. The alkyl amine and alkyl amine-like compounds which have been found to be effective for the purpose include hexamethylene diamine, hexamethylene tetramine, urea, and thiourea. These substances are all normally solid compounds at room temperature and normally would not be lost from the deposited film on long time storage. The liquid, more volatile, alkyl amines are also effective, but are generally impractical because of their high volatility and consequent loss from the deposited film. The amounts of such amines needed for stabilization is generally in the range of 0.1 to 30 mol percent of the halogenated compound in question.

The halogen compounds in Table III do not exhibit this difficulty in the presence of aryl amines and do not show a dark reaction on storage or in the deposited film prior to exposure. However, it is preferred to add to the agents listed in Table III an amount of stabilizer of the order of 0.1 to 1 mol percent of stabilizer based on the amount of halogenating agent for insurance purposes.

TABLE III

*Examples of Class A Halogenating Compounds*

[No alkaline additions required for mixing]

| No. | Name | Bond dissociation energy [1] (energy to produce first halogen free radical) kilogram calories per mole |
|---|---|---|
| 1 | Carbon tetrachloride | 68 |
| 2 | p-Dichlorbenzene | 74 |
| 3 | Tetrachlortetrahydronaphthalene | 69 |
| 4 | 1,2,3,4-tetrabrombutane | 59 |
| 5 | Hexachlorethane | 71 |
| 6 | 4-bromhiphenyl | 71 |
| 7 | 1-chloro-4-nitrobenzene | 70 |
| 8 | p-Bromacetanilide | 71 |
| 9 | 2,4-dichlorophenol | 69 |
| 10 | Hexachlorbenzene | 70 |
| 11 | 1,2,3,4-tetrachlorbenzene | 68 |
| 12 | 1,2,3,5-tetrachlorbenzene | 66 |
| 13 | Brominated polystyrene | 54 |

[1] Values reported in one or more of the following texts:
"Free Radicals in Solution" by C. Walling, John Wiley and Sons (1957), pp. 49 and 50.
"The Strengths of Chemical Bonds" by T. L. Cottrell, Butterworth's Scientific Publications (1958), pp. 204-209.
"Atomic and Free Radical Reactions" by E. W. R. Steacie, Rheinhold Publishing Co. (1954), pp. 71-98.

TABLE IV

*Examples of Class B Halogenating Compounds*

[Alkaline additions required for mixing]

| No. | Name | Bond dissociation energy [1] (energy to produce first halogen free radical) kilogram calories per mole |
|---|---|---|
| 14 | Carbon tetrabromide | 49 |
| 15 | Iodoform | 44 |
| 16 | n-Chlorsuccinimide | 56 |
| 17 | n-Bromsuccinimide | 46 |
| 18 | 2-chloranthraquinone | 52 |
| 19 | Tetrabromphenolphthalein | 56 |
| 20 | Tetrabromo-o-cresol | 54 |

[1] Values reported in one or more of the following texts.
"Free Radicals in Solution" by C. Walling, John Wiley and Sons (1957), pp. 49 and 50.
"The Strengths of Chemical Bonds" by T. L. Cottrell, Butterworth's Scientific Publications (1958), pp. 204-209.
"Atomic and Free Radical Reactions" by E. W. R. Steacie, Rheinhold Publishing Co. (1954), pp. 91-78.

It will be noted that many of the halogenating compounds are of certain generic classes where the basic structure is an aryl ring. In the preferred halogenating compounds there is more than one halogen attached directly to the ring or there is a halogen plus another substituent such as a nitro linkage, or an alkyl or an aryl linkage. In the case of halogenated alkyl derivatives, these are invariably quite heavily halogenated and usually to the maximum extent possible. In my print-out compositions, carbon tetrachloride is a very effective halogenating agent whereas the trichlor derivative, chloroform, is so very much less effective that it would not be considered for practical purposes. Apparently halogens attached to a cyclic nucleus other than of aryl derivation are effective even if a single halogen atom is involved. This generic description indicates that the activation energy of formation of the halogen radical is the important determining factor and, from the wavelengths of light which are required, it appears that in order for the halogenating derivative to be effective as a developer for the color of these aryl amines, it must have an energy of dissociation or, in other words, an energy of formation of the free halogen radical of not less than 40 kilogram calories per mole.

Theoretically and as confirmed by experiment, the amount of halogenating agent that can be used in combination with aryl amines of the types exemplified extends up to an amount such that one halogen free radical is available for reaction with each amine side chain available on the aryl amine. Actually it has been found that the full depth of color may be developed with very much less than this amount of halogenating agent and, from a stabilization standpoint, the less the amount of halogenating agent required to achieve the desired result the greater the stability of the system on storage after development and fixing. Generally speaking, the amount of halogen free radical produced per mol of halogenating agent is about one free radical per mol. In some instances two or possibly more free radicals per mol may be produced. In the case of carbon tetrachloride and carbon tetrabromide, for example, a single halogen free radical is formed and a fully halogenated methyl radical is left behind. Other evidence indicates that in the case of heavily halogenated molecules such as hexachlorethane and tetrabrombutane, possibly two halogen radicals per mol are developed on exposure to light. While it is theoretically possible that an amount of halogen free radical molecularly equivalent to each amine side chain may be utilized, in practice it has been found that as little as one (1) mol percent of halogen radical per aryl amine is sufficient to develop the full depth of color in some cases and the maximum needed to be considered for the most part is roughly ten (10) percent of the theoretical figure. In general, lesser quantities of the halogenating agents in Table IV on a molecular basis are required than the halogenating agents listed in Table III.

Referring again to stabilization of the mixture of aryl amine and halogenating agents through the use of alkyl amines and alkaline materials, the chlorine compounds generally require less of such stabilization agents than bromine compounds, and bromine types require less than iodine types. Extra amounts of stabilizing agents both of the type required prior to deposition in the form of the film and a second group to be described later are required to produce resonably stable results with the iodine compounds and even then they are not as satisfactory as bromine and chlorine derivatives. Accordingly the chlorine type halogenating agents are particularly preferred by me for this reason and because they are more readily available commercially than the corresponding bromine or iodine compounds.

Another type of stabilization is required to eliminate the tendency of the aryl amine to discolor on exposure to air or oxygen in the presence of light or heat or both. It appears that this type of color forming is a radically different type of reaction than that produced by the halogenating agents. The colors are different in hue and are generally lighter in shade. In addition, they develop extremely slowly. Actually some of the amines are quite stable under such conditions, but the most brilliantly colored and those which develop color most rapidly tend to be less stable. For example, if amine No. 1 is dispersed in a polystyrene film with no other additions, deposited and allowed to dry and exposed to air and light at room temperature, a faint blue color will develop in about two weeks and the color becomes quite pronounced after four to six weeks exposure. In polyvinyl acetate, a period of two to three months is required before a distinctive color develops. In both cases, the process is accelerated by heat.

I have found that certain organic reducing agents added to the film eliminate this type of "fogging" reaction. These stabilizers are utilized in minor amounts. A somewhat greater amount is required in non-oxygen containing plastic bases than in those which contain oxygen. Stabilizers which have been found effective for the purpose include the polyhydric phenols: hydroquinone, catechol, resorcinol, hydroxy hydroquinone, phloroglucinol; and amino-phenols such as o-aminophenol and p-aminophenol. It appears that the effective agent is the hydroxyl group attached to a benzene ring, providing there is at least another hydroxyl group or an amino group attached to the benzene ring in another position.

A system has now been provided comprising a plastic base or binder, an aryl amine, a free radical producing halogenating agent, a pre-deposition and pre-exposure stabilizer to prevent a dark reaction taking place between the halogenating agent and the aryl amine, a stabilizer for the light sensitive composition after exposure, fixing and on storage, and optionally includes an addition of another aryl amine which sensitizes the mixture to color development on exposure to visible light. Such a system is dissolved or dispersed in a suitable solvent or mixture of solvents and deposited on a suitable base such as glass, plastic, paper, and the like. After the solvent has been eliminated by evaporation, the film is then exposed to ultraviolet or visible light for an interval of between 5 and 60 seconds. After exposure, the image is fixed and continuing fogging of the background is prevented by heating the film at a temperature of 60° to 100° C. for about two minutes. After such heat treatment, the unexposed portions are insensitive to visible light for practical periods. In exceptional cases where such sensitivity may persist, it may be further reduced markedly by painting over the surface of the exposed film prior to heat development with a solution of polystyrene in toluene containing a minor percentage (e.g., 1 to 5% based on weight of polystyrene) of one or more of the polyhydric phenols or amino phenols described above.

The thermal reaction in the above described heating step appears to follow a different course than that exhibited by the light reaction. This thermal reaction appears to occur between the halogenating agent and the plastic base to yield a colorless compound which is no longer capable of producing free radicals which are effective in developing color with the aryl amine present.

The preferred composition ranges for these light sensitive image producing systems are given in Table V. As will be further defined in the examples, it is not necessary that all of the various ingredients in the composition be used for all the amines, but in general, the majority of these reagents are uniformly used.

Having defined my invention in detail, the following examples are indicative of my method of practice.

*Example 1.*—The following solution was prepared:

| | Grams |
|---|---|
| Toluene | 98 |
| Methyl alcohol | 2 |
| Polystyrene | 10 |
| Amine No. 13 | 4 |
| Hydroquinone | 0.2 |
| Halogenating compound No. 3 | 2.0 |

The solution was prepared under yellow light and coated on a glass plate by dipping. After the solvent had evaporated a transparent colorless film was obtained. Half of the film was blocked off with a piece of cardboard and the remaining half was exposed to a 275 watt General Electric sun lamp of the reflector type at a distance of 10 inches. The film was exposed for 25 seconds. The ultraviolet light was turned off and the exposed film was placed in an oven at 80° C. for two minutes. The exposed portion of the film was a deep purple black and the unexposed was a very faint, almost invisible pink, the black portion being opaque and the pink portion being completely transparent.

*Example 2.*—The following composition was prepared: toluene, 98 grams; methyl alcohol, 2 grams; polystyrene, 10 grams; amine No. 28, 8 grams; halogenating compound No. 5, 3 grams; phlorglucinol, 0.5 gram.

As in Example 1, the solution was prepared under yellow light and cast on a glass plate, and the solvent allowed to evaporate. Again a clear colorless film was obtained. This was exposed to ultraviolet light as before for a period of 40 seconds. After the ultraviolet light was turned off, the film was placed in an oven at 80° C. for three minutes. A deep almost opaque blue was obtained in the exposed portions and the unexposed portions were transparent and colorless.

*Example 3.*—The following solution was prepared under yellow light: methyl alcohol, 40 grams; acetone, 40 grams; toluene, 20 grams; polyvinyl acetate powder, 10 grams; amine No. 1, 8 grams; halogenating compound No. 4, 3 grams; hexamethylene diamine, 0.2 gram; orthoaminophenol, 0.1 gram. The dried film after casting on a glass plate was colorless and transparent. It is exposed to ultraviolet light as before for six seconds and heat treated in the dark at 70° C. for two minutes. A deep royal blue color was obtained in the exposed portion and the unexposed portion was colorless and transparent.

TABLE V

*Preferred Composition Ranges of Ingredients*

| Reagent: | Parts by weight (range) |
|---|---|
| Solvent | 500 to 1000 |
| Resin or plastic base | 100 |
| Aryl amines | 10 to 100 |
| Halogenating compound | 1 to 50 |
| Halogenator stabilizer | 0.1 to 10 |
| Oxygen stabilizer (optional) | 0.1 to 10 |
| Photosensitizer to visible (optional) | 1 to 5 |

*Overcoat Composition for Oxygen Stabilization*

PRIOR TO THERMAL FIXING

| | |
|---|---|
| Solvent | 1000 |
| Plastic or resin base | 100 |
| Oxygen stabilizer | 0.1 to 5.0 |

*Example 4.*—The following solution was prepared: trichlorethylene, 30 grams; acetone, 70 grams; cellulose acetate, 10 grams; amine No. 2, 7 grams; catechol, 1 gram; hexamethylene tetramine, 0.5 gram; halogenating compound No. 11, 4 grams. Again after preparation in yellow light, casting and drying on a glass plate, the composition was exposed to ultraviolet light for 5 seconds and heat fixed by treatment in the dark at 80° C. for two minutes. A deep green color was obtained in the exposed portions, and the unexposed background was substantially colorless and transparent with a very faint green tinge.

*Example 5.*—One gram of amine No. 3 was dissolved in 10 cc. of toluene and exposed to ultraviolet light for three minutes. A distinct yellow color developed as a result. Under red light, this partially exposed solution was added to a solution prepared as follows: acetone, 30 grams; toluene, 30 grams; methyl alcohol, 30 grams; ethyl cellulose, 10 grams; amine No. 2, 8 grams; halogenating agent No. 5, 4 grams; hydroquinone, 0.5 gram. While still under the darkroom red light, the solution was cast on a glass plate and a film produced by evaporation of the solvent. It was then exposed to a 250 watt reflector photo lamp at a distance of ten inches (substantially all the radiation of this lamp is in the visible) for a period of five seconds. After exposure and the turning off of the light, the image was fixed in the dark by heat treatment for four minutes at 70° C. A deep green color was obtained in the light exposed areas and the unexposed areas were transparent and substantially colorless.

*Example 6.*—The following solution was prepared under yellow light: toluene, 98 grams; methyl alcohol, 2 grams; polystyrene, 10 grams; amine No. 10, 9 grams; halogenating agent No. 16, 3 grams; zinc oxide, 1 gram; resorcinol, 1 gram. Solution was cast on a glass plate and dried as before, then exposed to ultraviolet light for twenty seconds. After heat treatment at 70° C. for three minutes, a bright green color was obtained in the exposed portions and in the unexposed but heat treated areas, the color was faintly opaquely white, probably due to the presence of zinc oxide.

*Example 7.*—The following solution was prepared in the dark; acetone, 50 grams; methyl acetate, 50 grams; cellulose nitrate, 10 grams; amine No. 4, 10 grams; halogenating agent No. 6, 4 grams; hexamethylene diamine, 0.1 gram; hydroquinone, 0.5 gram. After casting on a glass plate and evaporation of solvent, the film was exposed to the visible light referred to in previous examples for five seconds. After heat treatment in the dark for two minutes at 80° C., the exposed portions exhibited a deep red transparent color and the unexposed portions was substantially colorless but with a very faint pink overtone.

*Example 8.*—The following solution was prepared under yellow light: toluene, 98 grams; methyl alcohol, 2 grams; polystyrene, 10 grams; amine No. 17, 10 grams; halogenating agent No. 19, 5 grams; urea, 2 grams; hydroquinone, 1 gram. The solution was cast on a glass plate as before and exposed to the aforedescribed ultraviolet light for fifteen seconds. After heat treatment in the dark for two minutes at 80° C., a deep green opaque color was obtained in the exposed portions and a colorless transparent film in the unexposed portions.

*Example 9.*—The following solution was prepared under yellow light: toluene, 100 grams; methyl alcohol, 2 grams; amine No. 1, 7 grams; halogenating agent No. 5, 3 grams; hexamethylene diamine, 0.5 gram; hydroquinone, 0.5 gram. The film was cast on a glass plate as before and after completely dry was overcoated with a solution consisting of 100 grams of toluene, 10 grams of polystyrene, and 0.5 gram of orthoaminophenol. After exposure to ultraviolet light for eight seconds and heat treatment at 65° C. for three minutes, a deep blue-violet color was obtained in the exposed portions and the unexposed portions were transparent and colorless.

*Example 10.*—The following solution was prepared in the dark: methyl alcohol, 40 grams; acetone, 40 grams; toluene, 20 grams; polyvinyl acetate, 10 grams; amine No. 1, 1 gram; amine No. 2, 1½ grams; amine No. 3, 1 gram; amine No. 4, 2 grams; amine No. 6, 0.5 gram; halogenating agent No. 3, 5 grams; hydroquinone, 0.7 gram. The film was cast on a glass plate and dried as before and exposed to ultraviolet light for ten seconds. After heat fixing at 70° C. for three minutes, the exposed image was a deep lustrous black and the unexposed portions were transparent with a very faint blue tinge.

*Example 11.*—The following solution was prepared under yellow light: acetone, 50 grams; ethyl acetate, 50 grams; cellulose nitrate, 10 grams; amine No. 13, 8 grams; halogenating agent No. 14, 4 grams; hexamethylene diamine, 0.5 gram; hydroquinone, 0.5 gram. The dried films were exposed to ultraviolet light for twenty-five seconds and heat fixed at 80° C. for three minutes. The exposed portions exhibit a green brown color and the unexposed portions were transparent with a very faint pink tinge.

*Example 12.*—The following solution was prepared: methyl alcohol, 70 grams; toluene, 30 grams; polyvinyl acetate powder, 10 grams; amine No. 1, 7 grams; hydroquinone, 0.2 gram; hexamethylene diamine, 0.2 gram. This solution was prepared in dim room light and cast on a glass plate and the solvent allowed to evaporate. A clear, transparent, colorless film was obtained. Half of the film was exposed to the General Electric sun lamp described above at a distance of ten inches for thirty seconds and after such exposure, the film was heated in the dark for three minutes at 80° C.

After exposure and heat treatment, it was found that no color had developed in either the exposed or unexposed portions of the film and that there was no difference in contrast between such portions. The film was still clear, colorless, and transparent. After storage of the exposed film in diffuse room light for a period of six weeks, no evidence of color formation was found.

This example defines clearly the role of the halogenating compounds and the stabilizing action of both the polyhydric phenols and the alkyl amines.

I claim:

1. A dry photographic film producing a visible print-out image directly on exposure to ultraviolet light comprising: (1) a colorless film-forming plastic base material selected from the group consisting of cellulose derivatives and polymers of vinylidene monomers; (2) at least one colorless aromatic amine selected from the group consisting of amines wherein one valence of the amine nitrogen is attached to a ring carbon of an aromatic nucleus; and (3) at least one colorless organic halogen containing compound selected from the group consisting of halogenated hydrocarbons and halogenated substituted hydrocarbons having a bond dissociation energy to produce a first halogen as a free radical of not less than about 40 kilogram calories per mol and which releases halogen-containing free radicals on exposure to light of a suitable wave length, wherein said halogen-containing free radicals and the aromatic amine disposed in their immediate vicinity react to produce a color; the amount of aromatic amine comprising between 0.1 and 1 part by weight per part of the plastic, and the amount of organic halogen-containing compound comprising between 0.01 and 0.5 part by weight per part of the plastic, said film being characterized in that the mere exposure of same to light of a suitable wave length directly produces a visible image.

2. The composition of claim 1 containing in addition a stabilizer for the organic halogen-containing compound selected from the group consisting of alkyl amines and zinc oxide, and wherein the amount of said stabilizer is from 0.001 to 0.1 part by weight per part of film-forming plastic, by weight.

3. The composition of claim 1 containing in addition an effective amount of an antifogging agent for said composition selected from the group consisting of polyhydric phenols and aminophenols, and wherein the amount of said antifogging agent is from 0.001 to 0.1 part by weight per part of film-forming plastic, by weight.

4. The composition of claim 1 wherein the film-forming plastic is an oxygen containing plastic.

5. The composition of claim 1 wherein a plurality of arylamines are present to yield a visible print out image which is black.

6. A print-out member consisting of a support and a film deposited thereon consisting essentially of the composition of claim 1.

7. A print-out member consisting of a support and a colorless film deposited thereon consisting essentially of a film-forming plastic wherein there are dispersed at least one arylamine and at least one halogen containing compound which releases halogen-containing free radicals on exposure to light and which is reactive in said film on exposure to light to produce a colored reaction product as a result of said exposure to light; there being between 0.1 and 1 part of weight of arylamine per part by weight of film-forming plastic and between 0.01 and 0.5 part by weight of halogen-containing compound per part by weight of film-forming plastic, said halogen-containing compound being a halogenated hydrocarbon selected from the group consisting of compounds having a bond dissociation energy of not less than about 40 kilogram calories per mol to produce a halogen selected from the group consisting of Cl, Br and I as a free radical.

8. The print-out member of claim 7 provided with a protective layer overcoating the colorless film.

9. A composition comprising about 100 parts by weight of film-forming plastic material; between 10 and 100 parts by weight of arylamine; and between 1 and 50 parts by weight of an organic halogen containing compound which releases halogen containing free radicals reactive in said composition under the influence of light to produce a colored reaction product as a result of said exposure to light; there being between 0.1 and 1 part by weight of arylamine per part by weight of film-forming plastic and between 0.01 and 0.5 part by weight of a halogen compound per part by weight of film-forming plastic, said halogen compound being a halogenated hydrocarbon selected from the group consisting of compounds having a bond dissociation energy of not less than about 40 kilogram calories per mol to produce a halogen selected from the group consisting of Cl, Br and I as a free radical and said arylamine being selected from the group consisting of arylamines which in combination with said halogenated hydrocarbon produces a visible print-out image directly as a result of said exposure to light of a suitable wave length.

10. The composition of claim 9 with from 0.1 to 10 parts by weight of a compound selected from the group consisting of aminophenols and polyhydric phenols, as an antifogging agent for said composition.

11. The composition of claim 9 with from 0.1 to 10 parts by weight of basic compound from the group consisting of zinc oxide and alkyl amines, as a stabilizer for said halogen containing compound.

12. A method of developing visible images which comprises preparing a composition comprising about 100 parts by weight of film-forming plastic material; between 10 and 100 parts by weight of arylamine; and between 1 and 50 parts by weight of an organic halogen containing compound which releases halogen containing free radicals reactive in said composition under the influence of light to produce a colored reaction product as a result of said exposure to light; there being between 0.1 and 1 part by weight of arylamine per part by weight of film-forming plastic and between 0.01 and 0.5 part by weight of a halogen compound per part by weight of film-forming plastic, said halogen compound being a halogenated hydrocarbon selected from the group consisting of compounds having a bond dissociation energy of not less than about 40 kilogram calories per mol to produce a halogen selected from the group consisting of Cl, Br and I as a free radical and said arylamine being selected from the group consisting of arylamines which in combination with said halogenated hydrocarbon produces a visible print-out image directly as a result of said exposure to light of a suitable wave length, said composition being dissolved in a solvent for the film-forming plastic; depositing said composition on a support; evaporating the solvent, leaving a film on said support; and exposing selected portions of the resulting article, to light of a suitable wave length whereby a reaction occurs between the arylamine and the halogen free radicals generated by said exposure of said halogen-containing organic compound in said composition, producing a visible product directly as a result of said exposure to light.

13. The method of claim 12 wherein a sensitizer to visible light is incorporated in the composition prior to evaporation of the solvent.

14. The method of claim 13 wherein the sensitizer to visible light comprises a solution of at least one arylamine which has been exposed to ultraviolet light for a short time, sufficient to develop a color therein, prior to addition of same to the solution of the basic composition.

15. The method of claim 12 wherein a protective layer comprising a film-forming plastic containing an oxygen stabilizer is deposited from solution onto the supported film prior to exposure.

16. A composition comprising: about 10 parts by weight of a film-forming plastic dissolved in a solvent for said plastic; about 4–10 parts by weight of diphenylamine and about 2–6 parts by weight of carbon tetrabromide.

17. A method of producing stable colored print-out images which comprises: preparing a solution of a film-forming plastic; dispersing therein a colorless composition consisting essentially of (1) an organic halide selected from the group consisting of halogenated hydrocarbons and halogen substituted hydrocarbons having a bond dissociation energy to produce a first halogen as a free radical of not less than about 40 kilogram calories per mol and which on exposure to illumination yields halogen-containing free radicals and (2) a colorless arylamine which on reaction with said free radicals yields a colored reaction product; depositing the resulting composition as a thin layer on a solid support; eliminating the solvent from the composition; exposing the resulting dried film to light of a suitable wave length for an interval between about 5 and 60 seconds; whereby the free radicals are generated and the visible colored reaction product is produced directly in the exposed areas.

18. The method of claim 17 including in addition the step of fixing the image and background by heating the film after said exposure to light to a temperature between 60° and 100° C. for about two minutes.

19. The method of claim 18 modified to include the step of painting over the surface of the exposed film with a solution of polystyrene in toluene and containing a minor amount of at least one antifogging agent from the group consisting of polyhydric phenols and aminophenols.

References Cited in the file of this patent

UNITED STATES PATENTS

| | | |
|---|---|---|
| 1,574,357 | Beebe et al. | Feb. 23, 1926 |
| 1,587,270 | Beebe et al. | June 1, 1926 |
| 1,587,273 | Beebe et al. | June 1, 1926 |
| 1,587,274 | Beebe et al. | June 1, 1926 |
| 1,658,510 | Beebe et al. | Feb. 7, 1928 |
| 2,789,053 | Elliott | Apr. 16, 1957 |

OTHER REFERENCES

Freiman et al.: Abstracted in Chemical Abstracts, vol. 47 (1953), page 3558.

UNITED STATES PATENT OFFICE
CERTIFICATE OF CORRECTION

Patent No. 3,042,515                         July 3, 1962

Eugene Wainer

It is hereby certified that error appears in the above numbered patent requiring correction and that the said Letters Patent should read as corrected below.

Column 1, line 15, for "exposing" read -- forming --; columns 7 and 8, TABLE II, item No. 6, for "dipenyl" read -- diphenyl --; same columns 7 and 8, TABLE II, item No. 8 should appear in section 1 of the table entitled CLASS I and not in the section entitled CLASS 2.

Signed and sealed this 20th day of November 1962.

SEAL)
Attest:

ERNEST W. SWIDER                                DAVID L. LADD
Attesting Officer                                   Commissioner of Patents